A. H. COX.
JACK.
APPLICATION FILED FEB. 19, 1917.

1,237,481.

Patented Aug. 21, 1917.

Inventor
Arthur H Cox
by
John H Bow
attorney

UNITED STATES PATENT OFFICE.

ARTHUR H. COX, OF SHELBY, OHIO.

JACK.

1,237,481.   Specification of Letters Patent.   Patented Aug. 21, 1917.

Application filed February 19, 1917. Serial No. 149,426.

*To all whom it may concern:*

Be it known that I, ARTHUR H. Cox, a citizen of the United States of America, residing at Shelby, in the county of Richland and State of Ohio, have invented certain new and useful Improvements in Jacks, of which the following is a specification.

This invention relates to an improvement in jacks, of that type adapted to support the full weight of a vehicle, particularly a motor vehicle, to relieve all of the tires of such weight, while the vehicle is not in use.

The present invention has for its principal object the provision of a simple type of jack, capable of being readily arranged in the usual garage or other storage place, and constructed to support the entire weight of the vehicle in a position to relieve the tires of contact with the floor, thus freeing the tires of the vehicle weight and avoiding their deterioration through such weight, with a resultant prolonged tire life and usage.

An important feature of the present invention resides in the construction whereby the rear jack-bars are operated wholly independently of the forward jack-bars, and without in any manner affecting the forward jack-bars. This permits the vehicle to be restored to normal or floor plane, without any jar to the forward portion of the vehicle, as, by the present structure, the rear wheels are lowered, not swung, to the floor, before any movement is permitted the forward jack-bars, and hence no more jar is given the forward portion of the vehicle in lowering than in raising.

A preferred type of the improved jack is illustrated in the accompanying drawings, in which:—

Fig. 7 is a plan of the shaft operating handle.

The improved jack, as here shown, comprises a floor-frame 1, preferably to be secured to the floor of a garage or other storage place, though it is apparent that it may simply rest upon the floor, or may be of sufficient strength to be roller or caster supported, to permit the entire device to be moved with the supported automobile as desired.

Figure 1:
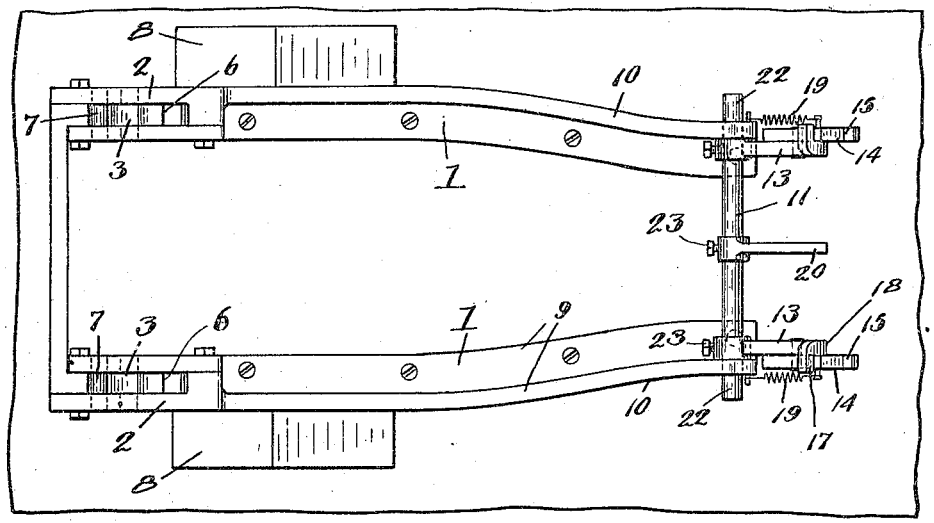
Figure 1 is a plan view of the jack constructed in accordance with the invention.
Figure 2:
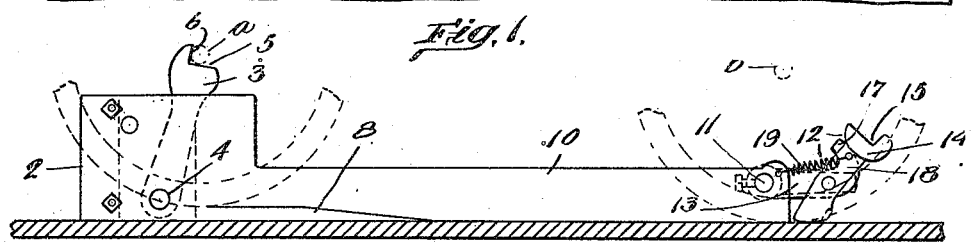
Fig. 2 is a side elevation of the same, the forward jack-bars being shown as engaged by the front axle.
Figure 3:
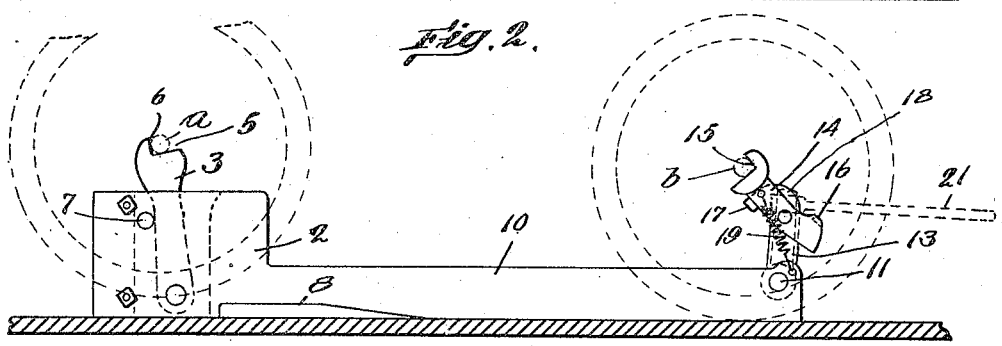
Fig. 3 is a similar view, showing the forward jack-bar in operative or vehicle-raising position, and the rear jack-bars in initial axle-engaging position.

The floor frame is formed at the forward end to provide hollow box-like supports 2, arranged in proper spaced relation. A forward jack-bar 3 is mounted for movement in each of said supports, being preferably pivoted therein. The jack-bars 3 are of elongated form having a pivot-opening near the lower end to receive a pivot 4 passing through the walls of the support. The upper ends of the jack-bars are notched at 5 to receive the forward axle $a$ of the vehicle, such notches being here shown as cut-out portions presenting abrupt shoulders 6 against which the axle contacts, as such axle rides onto the bars. The forward jack-bars are mounted to be normally held by gravity at a rearward inclination, that is, inclined from their pivots toward the approaching vehicle, as shown in Fig. 2, that is, constructed so that they will not remain in their operative positions without pressure thereon, but will at all times move to normal positions when free to act. The openings or walls of the supports are provided, or may be formed with limiting stops 7, so that under the influence of the moving vehicle the jack-bars may swing from a normal position to an operative, or vehicle supporting position against such stops. In such positions the jack-bars are slightly beyond their centers, but it will be noted that the bottoms of the notches 5 incline slightly upwardly and rearwardly, so that as the vehicle is drawn off the jacks the axle tends to return the jack-bars to normal positions.

A runway 8 is arranged on the outer side of each support 2, and preferably, though not necessarily secured to the floor frame. The runways are simply blocks or strips to receive the front wheels of the vehicle, and by the travel of the wheels thereon raise the forward end of the vehicle to place the forward axle in the notched ends of the jack-bars. The runways are inclined toward and into coincidence with the floor at the entrant ends and abruptly terminate at a point in the rear of that occupied by the lowermost points of the forward wheels when the forward axle on the jack-bars is in extreme forward position. As the jack-bars swing under the advancing axle, they raise the same, and hence support the forward tires clear of the surface or floor.

The rear portion of the floor frame is extended from the supports 2, as frame-bars of angle formation, as at 9, presenting upright sections 10. The frame-bars preferably converge rearwardly to narrow the rear end of the jack to avoid interference with the break drums or other parts of the vehicle. A shaft 11 is mounted in the uprights 10, near their rear or free ends and transversely of the floor frame. The rear jack-bars 12 are arranged on this shaft, each comprising a shaft-connected section 13 and an axle-engaging section 14, pivotally connected to the shaft connected section.

The upper ends of the axle-engaging sections 14 are notched or otherwise formed, at 15, to engage the rear axle housing of the vehicle, such notches, though preferably identical with the notches 5 of the forward jack-bars, being reversely formed, as the respective jack-bars engage the axles from opposite sides. The lower end of the axle-engaging section of the rear jack-bar is formed with a laterally extending lug 16 to engage with the shaft-connected section when said axle section pivots over the center of gravity, that is in operative position; while the upper end of the shaft-connected section is formed with a laterally-extending lug 17 at the terminal of a forwardly extending arm 18, serving to limit forward movement of the axle engaging section to hold the sections in angularly-related positions, which is their normal position. A spring 19 connected to the frame upright 10 and to the axle-engaging section of each jack-bar, serves to hold the sections in normal positions, the springs being preferably so arranged with relation to the pivots of the sections, that they will tend also to hold the sections in operative positions, as will be apparent from Fig. 4.

In normal positions the upper ends of the rear jack-bars are so located that, after raising the front end of the vehicle on the forward jack-bars, a turning of the shaft 11, will engage the rear jack-bars with the rear axle or housing b. The shaft 11 is provided with an operating projection 20, adjustably secured by which the shaft may be turned. Following the engagement of the rear jack-bars with the rear axle or housing, the shaft is forced through a slightly further rotation, a handle member 21, shown in Fig. 7, and formed with a slotted head, being engaged with the projection 20 for this purpose. The additional rotation of the shaft straightens the jack-bar sections, after the manner of a toggle lever action, raising the rear axle, to support the vehicle free of tire contact with the floor or the like.

The shaft 11 is preferably of such length that it extends outwardly beyond the floor-frame to provide portions as 22, on which the rear jack-bars may be mounted, in the event the particular vehicle requires such spacing of the jacks. The jacks, as well as the projection 20 are adjustably secured on the shaft, as before explained, and as here shown, through the medium of set screws 23, to permit any desired spacing between the parts made necessary by the requirements of the particular vehicle.

Figures 4, 5, 6:
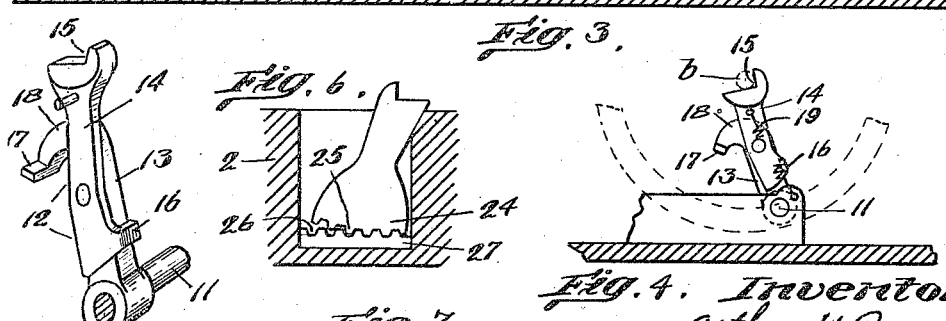
Fig. 4 is a broken side elevation, showing the rear jack-bars in fully operative or vehicle raising position.
Fig. 5 is a perspective view of one of the rear jack-bars.
Fig. 6 is a sectional detail, showing a modified form of forward jack-bar.

In Fig. 6 there is shown a modified form of forward jack-bar, which may be used if desired. The bar is not pivoted in the support, but is formed at the lower end with a rounded end 24, having notches or teeth 25, to engage teeth 26 in a straight jack-bar 27 secured in the bottom of the support. This jack bar operates exactly as the preferred form, the toothed engagement preventing slipping, and the bar being normally influenced by gravity to a rearward inclination.

The use of the improved jack permits the automobile to be moved under its own or other power to a position to automatically raise its forward end to clear the tires, the rear end being manually raised as described. The lowering of the rear end, by obvious reverse operation to the raising movement described, places the traction wheels on the floor or surface, so that the forward wheels may be readily moved rearwardly off the jack-bars.

It is to be particularly noted that, even with the vehicle in the front jack-bars, the latter are but slightly beyond the vertical, and that with the rear jack-bars in operation, said rear jack-bars act to force the vehicle toward the forward jack-bars, thus acting to hold the latter in vehicle-supporting position. Furthermore, the forward jack-bars are not permitted to move, either in elevating or lowering the rear jack-bars, and the action of the latter is such as to cause a direct up and down movement of the rear portion of the vehicle. Therefore, in lowering the vehicle the rear wheels are placed on the floor or frame surface, without any possibility of movement of the forward jacks, and hence the lowering of the forward portion of the vehicle is controlled through movement of the car on the driving wheels, permitting the operator to lower the forward portion of the vehicle without appreciable jar.

It will be apparent that the manual operation of the rear jacks in both raising and lowering the vehicle is important, in that it permits the forward jacks when in operative position, to be arranged at a much less over-balanced forward position than would be otherwise possible. It will be noted from Fig. 2, that in the operative position the forward jacks are but slightly forward of the vertical line of their pivots and that the weight of the vehicle alone, assuming the rear wheels to be resting on the ground surface and the vehicle free to move, would probably be sufficient to lower the forward jacks. However, the rear jacks directly raise and lower the rear end of the vehicle, that is move the rear end of the vehicle without the slightest swing movement thereof. Therefore, particularly in lowering, the rear wheels are placed on the ground, or other surface, before there is a possibility of movement of the forward portion of the vehicle. Under these circumstances it is only necessary to give the slightest elevation and the slightest incline to the raising and lowering operation of the forward portion of the vehicle, as the operation of rear portion of the vehicle absolutely holds the forward portion against possibility of movement. The forward jacks as the vehicle is moved to withdraw the forward end thereof from such jacks therefore have but a slight swing, and will, as a result lower the vehicle without jar.

Having thus described the invention, what is claimed as new is—

1. An automobile jack comprising a frame, independent forward jacks mounted therein, a shaft journaled in the rear portion of the frame, rear jack-bars arranged on the shaft, and means for operating the shaft, each rear jack-bar comprising a shaft-connected section and an axle-engaging section pivotally connected to the shaft-connected section.

2. An automobile jack comprising a frame, independent forward jacks mounted therein, a shaft journaled in the rear portion of the frame, rear jack-bars arranged on the shaft, and means for operating the shaft, each rear jack-bar comprising a shaft-connected section and an axle-engaging section pivotally connected to the shaft-connected section, the sections being formed to limit relative pivotal movement in each direction.

3. An automobile jack comprising a frame, forward jack-bars carried thereby, a shaft mounted in the frame, rear jack-bars comprising pivotally-connected sections, one section of each rear jack-bar being secured on the shaft, means for normally maintaining the sections of each bar in angularly-related positions, and means for operating the shaft to simultaneously aline the angularly-related sections to thereby move the free ends of the jack-bars from the shaft.

4. An automobile jack comprising a frame, forward jack-bars carried thereby, a shaft mounted in the frame, rear jack-bars comprising pivotally connected sections, one section of each rear jack-bar being secured on the shaft, springs for normally maintaining the sections of each bar in angularly-related positions, and means for operating the shaft to simultaneously aline the angularly-related sections to thereby move the free ends of the jack-bars from the shaft.

In testimony whereof I affix my signature.

ARTHUR H. COX.